(12) United States Patent
Ye et al.

(10) Patent No.: US 12,081,487 B2
(45) Date of Patent: Sep. 3, 2024

(54) SYSTEMS AND METHODS FOR SIGNALING SCHEME FOR CAST-TYPE INDICATION AND RESOURCE INDICATION

(71) Applicant: APPLE INC., Cupertino, CA (US)

(72) Inventors: Chunxuan Ye, San Diego, CA (US); Chunhai Yao, Beijing (CN); Dawei Zhang, Cupertino, CA (US); Haitong Sun, Cupertino, CA (US); Hong He, Cupertino, CA (US); Jie Cui, Cupertino, CA (US); Oghenekome Oteri, San Diego, CA (US); Wei Zeng, Cupertino, CA (US); Weidong Yang, San Diego, CA (US); Yang Tang, Cupertino, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 316 days.

(21) Appl. No.: 17/593,111

(22) PCT Filed: Apr. 6, 2021

(86) PCT No.: PCT/CN2021/085720
§ 371 (c)(1),
(2) Date: Sep. 9, 2021

(87) PCT Pub. No.: WO2021/204126
PCT Pub. Date: Oct. 14, 2021

(65) Prior Publication Data
US 2022/0311583 A1    Sep. 29, 2022

(30) Foreign Application Priority Data
Apr. 7, 2020    (WO) ................ PCT/CN2020/083600

(51) Int. Cl.
*H04L 12/28*    (2006.01)
*H04L 1/1812*    (2023.01)
(Continued)

(52) U.S. Cl.
CPC .......... *H04L 5/0055* (2013.01); *H04L 1/1812* (2013.01); *H04W 72/20* (2023.01)

(58) Field of Classification Search
CPC ... H04L 1/1812; H04L 1/1825; H04L 1/1861; H04L 1/1896; H04L 5/0023;
(Continued)

(56) References Cited

U.S. PATENT DOCUMENTS

| | | |
|---|---|---|
| 10,785,753 B1 * | 9/2020 | Li ..................... H04L 5/0044 |
| 11,533,745 B2 * | 12/2022 | Hong .................. H04L 1/0041 |
| 2021/0250150 A1 * | 8/2021 | Wu ..................... H04L 1/1861 |

FOREIGN PATENT DOCUMENTS

| | | |
|---|---|---|
| CN | 109792370 A | 5/2019 |
| CN | 111727575 A | 9/2020 |

(Continued)

OTHER PUBLICATIONS

CATT, "Remaining issues on physical layer procedures for NR V2X", R1-2000524, 3GPP TSG RAN WG1 Meeting #100, e-Meeting, Agenda Item 7.2.4.5, Feb. 24-Mar. 6, 2020, 5 pages.
(Continued)

*Primary Examiner* — Phuc H Tran
(74) *Attorney, Agent, or Firm* — Dorsey & Whitney LLP

(57) ABSTRACT

Methods, systems, and devices for signaling in cast-type indication for a wireless communication system may include receiving, at a first user equipment (UE), a first stage sidelink control information (SCI) format from a second UE, decoding the first stage SCI format, determining a second stage SCI format using the decoded first stage SCI format, decoding the second stage SCI format, and determining a sidelink feedback status using the second stage SCI format. The sidelink feedback status may indicate whether sidelink feedback is enabled or not enabled. Second stage SCI content may include a distance setting associated with a communication range between the first UE and the second UE.

20 Claims, 10 Drawing Sheets

(51) Int. Cl.
*H04L 5/00* (2006.01)
*H04W 72/20* (2023.01)

(58) Field of Classification Search
CPC ... H04L 5/0033; H04L 5/0053; H04L 5/0055; H04L 5/0091; H04W 72/20
See application file for complete search history.

(56) References Cited

FOREIGN PATENT DOCUMENTS

| | | | |
|---|---|---|---|
| CN | 111757385 | A | 10/2020 |
| CN | 113260059 | A | 8/2021 |
| EP | 4029297 | A1 | 7/2022 |
| WO | 2020033088 | A | 2/2020 |
| WO | 2020033704 | A1 | 2/2020 |
| WO | 2020068973 | A1 | 4/2020 |
| WO | 2021159318 | A1 | 8/2021 |

OTHER PUBLICATIONS

Oppo, "Remaining issues of physical layer procedure for NR-V2X", R1-2000492, 3GPP TSG RAN WG1 #100, e-Meeting, Agenda Item 7.2.4.5, Feb. 24-Mar. 6, 2020, 11 pages.

PCT/CN2021/085720, International Search Report and Written Opinion, Jul. 5, 2021, 11 pages.

Qualcomm Incorporated, "Procedures and use cases for groupcast and unicast transmissions", R1-1811260, 3GPP TSG RAN WG1 Meeting #94bis, Chengdu, China, Agenda Item 7.2.4.1.1, Oct. 8-12, 2018, 4 pages.

CATT, "Support of unicast, groupcast and broadcast in NR sidelink", R1-1810539, 3GPP TSG RAN1 Meeting #94bis, Chengdu, China, Agenda Item 7.2.4.1.1, Oct. 8-12, 2018, 9 pages.

* cited by examiner

SYSTEMS AND METHODS FOR SIGNALING SCHEME FOR CAST-TYPE INDICATION AND RESOURCE INDICATION

TECHNICAL FIELD

This application relates generally to wireless communication systems.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node or g Node B (gNB).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Second Stage SCI

Figure 1:
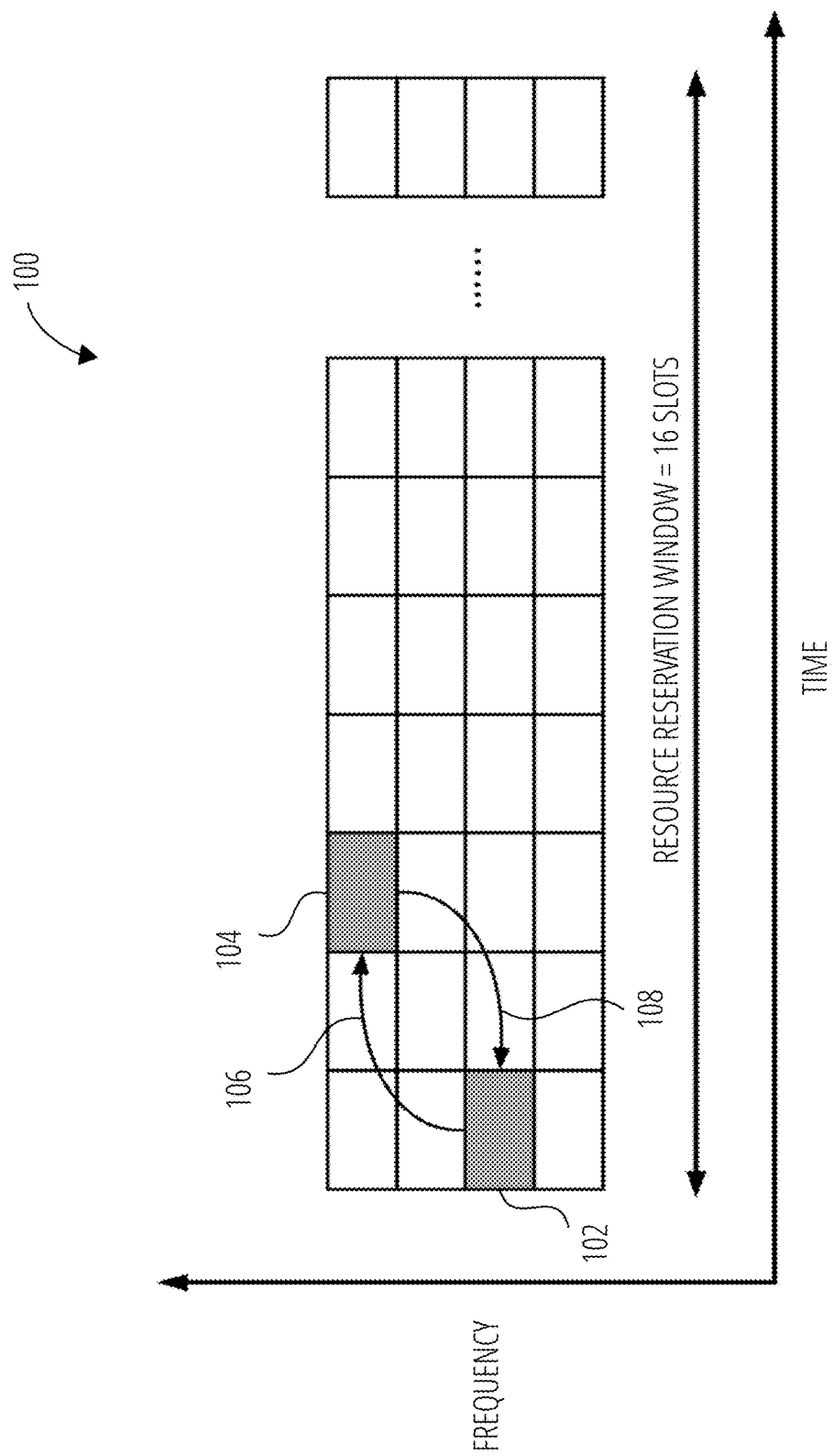
FIG. 1 illustrates a diagram showing resource reservation and indication in LTE V2X in accordance with certain embodiments.

In new radio (NR) vehicle to everything (V2X), two stage sidelink control information (SCI) is supported. SCI stage 1 is carried on the physical sidelink control channel (PSCCH) and can include polar code adopted for NR downlink control information and applied to PSCCH. SCI stage 2 is carried on the physical sidelink shared channel (PSSCH) and can include polar coding used for physical downlink control channel (PDCCH) applied to SCI stage 2.

The SCI stage 1 contents can include one or more of priority bits (e.g., 3 bits), PSSCH frequency and time resource assignment, resource reservation period, demodulation reference signal (DMRS) pattern (e.g., if more than 1 pattern is configured per resource pool), SCI stage 2 format, beta_offset indicator, DMRS port number (e.g., 1 bit), modulation and coding scheme (MCS) (e.g., 5 bits), and reserved bits (e.g., all zero) (e.g., 2-4 bits). A single SCI stage 1 format may be provided per resource pool, and resource size may be fixed.

The SCI stage 2 contents can include a cyclic redundancy check (CRC) (e.g., 24 bits) and additional fields as needed. Table 1 below shows exemplary SCI stage 2 content fields for various SCI stage 2 formats including, for example, broadcast, unicast without feedback, groupcast without feedback, unicast with feedback, groupcast option 1 with feedback, and groupcast option 2 with feedback. The SCI stage 2 content fields include, for example, source ID; destination ID; hybrid automatic repeat request (HARQ) ID, new data indicator (NDI), redundancy version (RV); channel status information (CSI) request; and communication range and zone ID. The presence of each field for particular formats is shown in Table 1, as well as exemplary bits for each content field. Total bits without (w/o) CRC and reserved bits for each format is also shown in Table 1. As shown by Table 1, CSI request may only be provided for unicast formats, and communication range and zone ID may only be provided for groupcast option 1 with feedback. For example, communication range and zone ID is related to communication range between a transmitting user equipment (UE) and receiving UE. For example, the communication range is a distance setting associated with a communication range between the receiving UE and a transmitting UE.

TABLE 1

| | Source ID (8 bits) | Destination ID (16 bits) | HARQ ID; NDI; RV (about 7 bits) | CSI request (1 bit) | Communication range and zone ID (16 bits) | Total w/o CRC & reserved bits |
|---|---|---|---|---|---|---|
| Broadcast | Yes | Yes | Yes | No | No | 31 |
| Unicast without feedback | Yes | Yes | Yes | Yes | No | 32 |
| Groupcast without feedback | Yes | Yes | Yes | No | No | 31 |
| Unicast with feedback | Yes | Yes | Yes | Yes | No | 32 |
| Groupcast Option 1 with feedback | Yes | Yes | Yes | No | Yes | 47 |
| Groupcast Option 2 with feedback | Yes | Yes | Yes | No | No | 31 |

Feedback associated with SCI stage 2 formats included in Table 1 may include acknowledgment (ACK) and/or negative acknowledgment (NACK) that indicate to a transmitting UE whether a receiving UE successfully received transmission from the transmitting UE. ACK may be transmitted if the transmission was successfully received by the receiving UE. NACK may be transmitted if the transmission was not successfully received by the receiving UE. For instance, in SCI stage 2, unicast with feedback may include both ACK and NACK feedback, groupcast option 1 with feedback may include only NACK, and groupcast option 2 with feedback may include both ACK and NACK.

Groupcast HARQ Feedback Option 1

For example, groupcast option 1 with feedback may include a HARQ NACK only. Here, in transmission from a transmitter UE to a receiver UE, the receiver UE may not feedback if it decodes PSSCH, and may only feedback NACK if it does not decode PSSCH. A single physical sidelink feedback channel (PSFCH) resource may be shared by all receiver UEs who send NACK feedback.

For example, groupcast option 1 with feedback may include feedback that is distance based. The distance based feedback is not used if transmitter UE (Tx UE) location is unavailable. If receiver UE (Rx UE) location is unavailable, radio access network2 (RAN2) may handle feedback. For example, transmitter-receiver (Tx-Rx) distance may be between the center location of the indicated zone of a Tx UE nearest to the Rx UE and Rx UE's own exact location. For example, Tx UE may send to the Rx UE the zone ID in which the Tx UE belongs to. The Rx UE may not feedback if its distance to the Tx UE is larger than a defined communication range requirement (e.g., the distance is out of range). Moreover, Tx UE location may be carried in SCI stage 2 for Rx UE's distance calculation, where zone may be pre-configured with respect to geographical area, zone ID may be associated with Tx UE's location, and zone length and zone width may always be the same and configurable among, e.g., 5, 10, 20, 30, 40, 50 meters. For example, the communication range requirement may be explicitly indicated in SCI stage 2 using, for example, 4 bits, where distances may include, e.g., 20, 50, 80, 100, 120, 150, 180, 200, 220, 250, 270, 300, 320, 350, 370, 400, 420, 450, 480, 500, 550, 600, 700, 1000, spares meters. Spares implies future use.

Resource Indication in LTE V2X

FIG. 1 illustrates a diagram 100 showing resource reservation and indication in LTE V2X for a current transport block (TB) according to certain embodiments. For the current TB, there can be two transmissions, for example: an initial transmission TB 102 and a retransmission TB 104. Since the resource reservation window in the example shown by diagram 100 has 16 slots, there may be up 16 transmissions of the current TB. Each transmission may have associated SCI. For example, in resource reservation for the current TB, at most Nmax=2 sidelink resources may be reserved in SCI for blind retransmission and SCI signaling may be allowed to indicate one or two resources. The same number of sub-channels may be included for each resource. Resource reservation may include full flexibility in time and frequency position of the resources in a resource reservation window. Time gap between all reserved resources indicated in a SCI may be below 16 slots in the diagram 100 example.

SCI may include a "resource index" field that indicates to a receiving UE whether the current resource is the first resource (e.g., having forward indication) or the second resource (e.g., having backward indication). In FIG. 1, for example, the resource index in SCI for initial transmission TB 102 may indicate the current resource is the first resource as it includes forward indication 106. Initial transmission TB 102 may reserve retransmission in SCI. For example, the resource index in SCI for retransmission TB 104 may indicate the current resource is the second resource as it indicates backward indication 108. Retransmission TB 104 may indicate its own resource and also a resource in the past via backward indication 108.

Resource Indication in NR V2X

Figure 2:
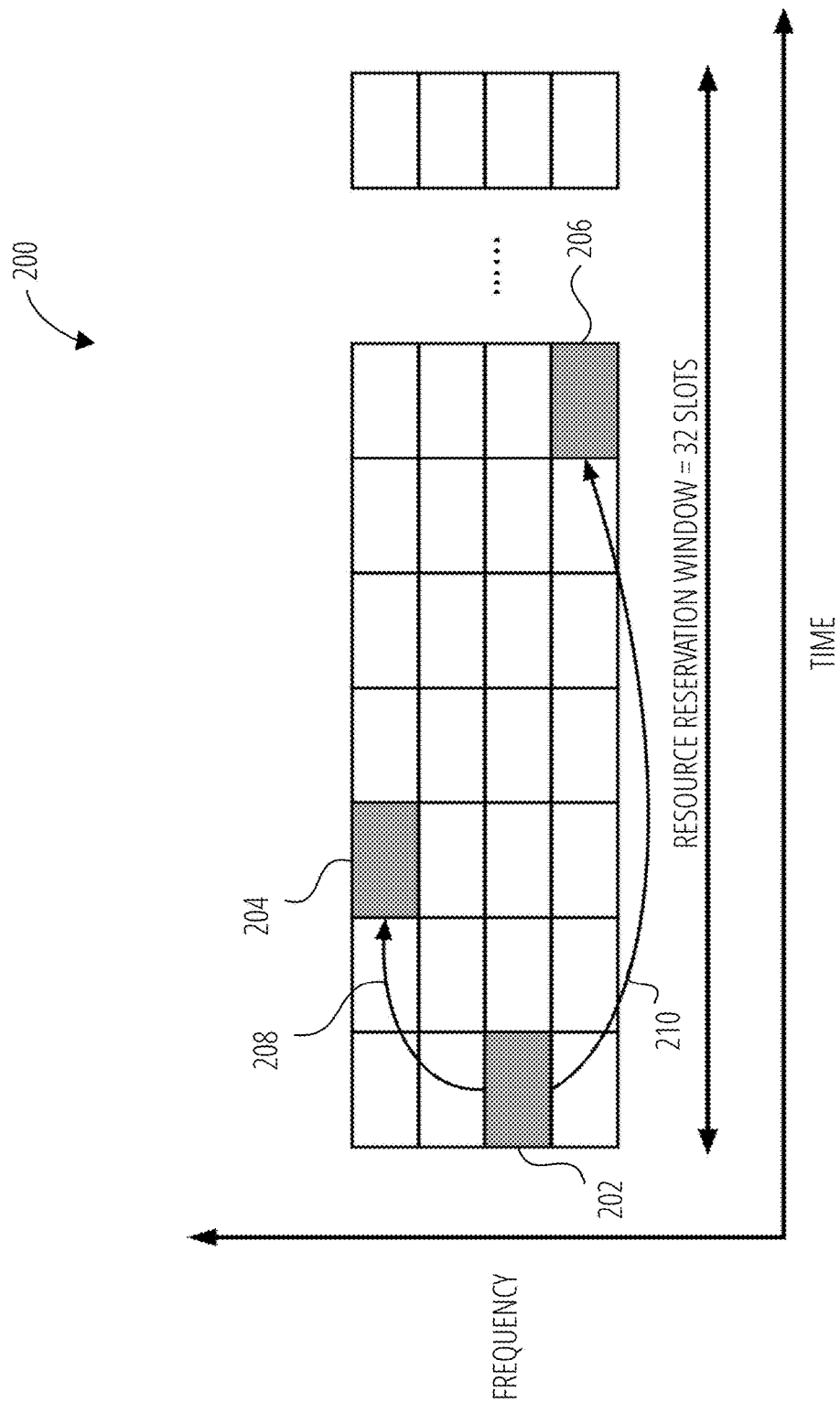
FIG. 2 illustrates a diagram showing resource reservation and indication in NR V2X in accordance with certain embodiments.

FIG. 2 illustrates a diagram 200 showing resource reservation and indication in NR V2X for a current TB according to certain embodiments. For the current TB, there can be three transmissions, for example: an initial transmission TB 202, a retransmission TB 204, and a retransmission TB 206. Since the resource reservation window in the example shown by diagram 200 has 32 slots, there may be up 32 transmissions of the current TB. Each transmission may have associated SCI. For example, in resource reservation for the current TB, at most Nmax sidelink resources are reserved in SCI and may be pre-configured per resource pool as two sidelink resources or three sidelink resources. For example, SCI signaling may be allowed to indicate one, two, or three resources. Time resources may be indicated and reflect (1) time gap between first and second resources and (2) time gap between first and third resources. Frequency resources may be indicated and may reflect (1) starting sub-channel index of second resource; (2) starting sub-channel index of third resource; and (3) number of sub-channels per resource. In the example shown by diagram 200, initial transmission TB 202 points to retransmission TB 204 via forward indication 208 and retransmission TB 206 via forward indication 210.

The RAN1 #100e agreement indicated selection at the next meeting of one of the following options 1, 2, or 3 regarding backward and forward indication.

Option 1: there is no separate field in the first stage SCI indicating a resource index for the purpose of backward indication, i.e., backward indication is not supported. In option 1, initial transmission TB 202 points to retransmission TB 204 via forward indication 208 and retransmission TB 206 via forward indication 210, retransmission TB 204 points to retransmission TB 206 via a forward indication, and retransmission TB 206 does not have a forward or backward indication.

Option 2: when periodic reservations are enabled in a resource pool, a separate field of 1 bit in the first stage SCI indicates a resource index for the purpose of backward indication. In option 2, initial transmission TB 202 points to retransmission TB 204 via forward indication 208 and retransmission TB 206 via forward indication 210, retransmission TB 204 points to retransmission TB 206 via a forward indication and to initial transmission TB 202 via a backward indication, and retransmission TB 206 points to initial transmission TB 202 via a backward indication and has no forward indication.

Option 3: when periodic reservations are enabled in a resource pool, a separate field of ceil(log 2(Nmax)) bit in the first stage SCI indicates a resource index for the purpose of backward indication. In option 3, initial transmission TB 202 points to retransmission TB 204 via forward indication 208 and retransmission TB 206 via forward indication 210, retransmission TB 204 points to retransmission TB 206 via a forward indication, and retransmission TB 206 points to initial transmission TB 202 via a backward indication and retransmission TB 204 via a backward indication and has no forward indication.

In certain embodiments, second stage SCI formats of the present disclosure are designed to provide certain indications. For example, a signaling scheme for cast-type indication is provided.

For example, in one embodiment, two second stage SCI formats may be defined. The first format is used for broadcast, unicast and groupcast without feedback, groupcast option 2, and unicast with feedback. The second format may be used for groupcast option 1. Here, the field of second stage SCI format in first stage SCI may be 2 bits, to indicate one of two second stage SCI formats. The last two code points of this field may be reserved for future use.

For example, in one embodiment, for the first format of second stage SCI, an additional bit is included in second stage SCI to indicate whether HARQ feedback is disabled. The first format of second stage SCI is used for groupcast option 2 and unicast with feedback. The PSFCH resource determination schemes are different for these two cast types. For example, the PSFCH resource for unicast is determined only by layer 1 source ID, while the PSFCH resource for groupcast option 2 is determined by both layer 1 source ID and group member ID. Hence, the PSFCH resource determination scheme may be indicated if HARQ feedback is enabled.

For example, in one embodiment, for the first format of second stage SCI, an additional bit is included in second stage SCI to indicate PSFCH resource determination scheme. The polar coding used for PDCCH is applied to the second stage SCI. The CRC length of second stage SCI is 24 bits, which is the same as CRC length of PDCCH. The 24-bit CRC polynomial is designed to support the early termination functionality of polar decoding, which may be of value for UE with limited processing capability and power. In sidelink, the same polar decoding early termination is applied at the Rx UE to save processing time and power.

In some examples, shorter CRC length for second stage SCI may be used to reduce overhead. However, the payload size of second stage SCI may be more than 30 bits, which may be similar to fallback DCI payload size. Since a fallback DCI uses 24-bit CRC, the same CRC length may be applicable to second stage SCI.

Signaling Scheme for Cast-type Indication (1-1)

Figure 3:
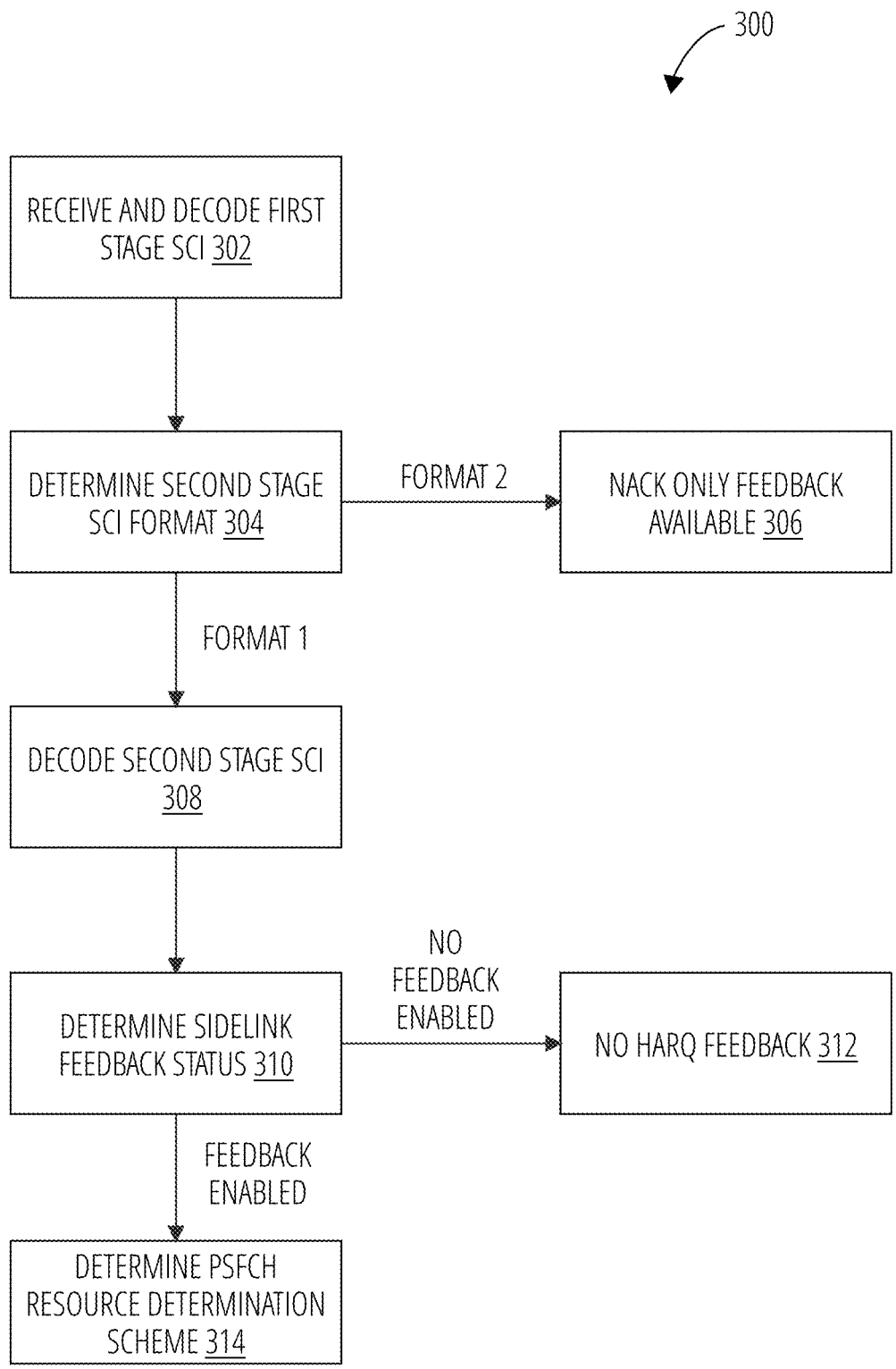
FIG. 3 illustrates a procedure for a signaling scheme for cast-type indication in accordance with certain embodiments.

FIG. 3 illustrates a procedure 300 for a signaling scheme for cast-type indication according to certain embodiments. It should be noted that as used herein, a stage 1 SCI format can also be referred to as a first stage SCI format (and vice-versa), and a stage 2 SCI format can also be referred to as a second stage SCI format (and vice-versa). At block 302, SCI stage 1 format is received and decoded at a UE. For example, the SCI stage 1 format is received at a first UE from a second UE. For example, SCI stage 1 format may include a single format. At block 304, the SCI stage 2 format is determined from the decoded SCI stage 1 format of block 302. For example, the SCI stage 2 format may be a format 1, which includes broadcast, unicast without feedback, groupcast without feedback, groupcast HARQ feedback option 2, and unicast with feedback formats. Otherwise, the SCI stage 2 format may be a format 2, which is groupcast HARQ feedback option 1. If the SCI stage 2 format is determined as format 2, procedure 300 continues to block 306, which is explained below. If the SCI stage 2 format is determined as one of the format 1 formats, then procedure 300 continues to block 308.

At block 308, the SCI stage 2 format is decoded at the UE. In certain embodiments, the decoding allows for a determination of whether feedback is enabled. For example, in certain embodiments, 1 bit is used in the SCI stage 2 format field to indicate whether sidelink feedback is enabled or not. For example, for the broadcast format, unicast without feedback format, and groupcast without feedback format, this bit is zero. For example, for the groupcast HARQ feedback option 2 and unicast with feedback formats, this bit is one. At block 310, a sidelink feedback status is determined (e.g., whether sidelink feedback is enabled or disabled) using the decoded SCI stage 2 format of block 308. If no feedback is enabled (e.g., the bit is used in the SCI stage 2 format field to indicate whether sidelink feedback is enabled or not is zero) no HARQ feedback is enabled as shown in block 312. Here, for example, the SCI stage 2 format is broadcast, unicast without feedback, or groupcast without feedback.

If feedback is enabled (e.g., the bit is used in the SCI stage 2 format field to indicate whether sidelink feedback is enabled or not is one), for example, the SCI stage 2 format is groupcast HARQ feedback option 2 or unicast with feedback. Procedure 300 therefore continues to block 314, where a PSFCH resource determination scheme is determined. In certain embodiments, 1 bit is used to indicate PSFCH resource determination scheme if feedback is enabled. For example, if the PSFCH resource determination scheme is determined by source ID, this bit is zero. If the PSFCH resource is determined by source ID and group member ID, this bit is one. In unicast, PSFCH resource is determined by source ID so the bit is zero. For groupcast HARQ option 2, PSFCH resource is determined by source ID and group member ID so the bit is one.

As noted above, if at block 304 SCI stage 2 format is determined as format 2, which is groupcast HARQ feedback option 1, procedure 300 continues to block 306. At block 306, it is determined that since the format is groupcast HARQ feedback option 1, NACK only feedback is available. In certain embodiments, only distance-based groupcast option 1 NACK feedback is supported. In certain other embodiments, both distance based and non-distance based groupcast option 1 NACK feedback are supported. For example, to support non-distance-based groupcast option 1 NACK feedback, the communication range requirement field is set as infinite in SCI stage 2 contents. Thus, no matter what the distance between a Tx UE and Rx UE, HARQ feedback is always triggered and NACK feedback will be sent for PSSCH decoding error. Actual distance between Tx and Rx UEs is therefore rendered irrelevant in non-distance-based groupcast option 1 NACK feedback. For example, the communication range requirement can be (pre)configured to the infinite value and the SCI stage 2 content may have a code point to indicate the infinite communication range requirement. For example, non-distance based groupcast option 1 NACK feedback may be enabled or disabled by resource pool (pre)configuration, configuring the 4 bits of the range requirement as infinite.

For example, in certain embodiments, support for non-distance-based groupcast HARQ feedback option 1 is based on resource pool (pre)configuration. If the (pre)configured communication range requirement includes an infinite value, then the non-distance-based groupcast HARQ feedback option 1 is applied when the configured communication range requirement contains an infinite value and this value is indicated in SCI. Here, the sidelink groupcast HARQ feedback options can be distinguished by different second stage SCI formats. In other words, for example, one second stage SCI format can be used for groupcast HARQ feedback option 1, and another second stage SCI format can be used for groupcast HARQ feedback option 2 as well as broadcast and unicast.

For example, in certain embodiments, different second stage SCI formats can be used for groupcast HARQ feedback option 1 and option 2. Since one second stage SCI format is used for groupcast HARQ feedback option 1, it may not include another flag to indicate whether HARQ feedback is enabled or disabled. However, for another second stage SCI format for broadcast, unicast and groupcast HARQ feedback option 2, a flag can be used to indicate whether HARQ feedback is enabled or not. This scheme indicates whether HARQ feedback is enabled or disabled to receiver UE.

For example, in certain embodiments, in the second stage SCI format for broadcast, unicast and groupcast option 2, a flag can be used to indicate whether HARQ feedback is enabled or not.

Signaling Scheme for Cast-type Indication (1-2)

Figure 4:
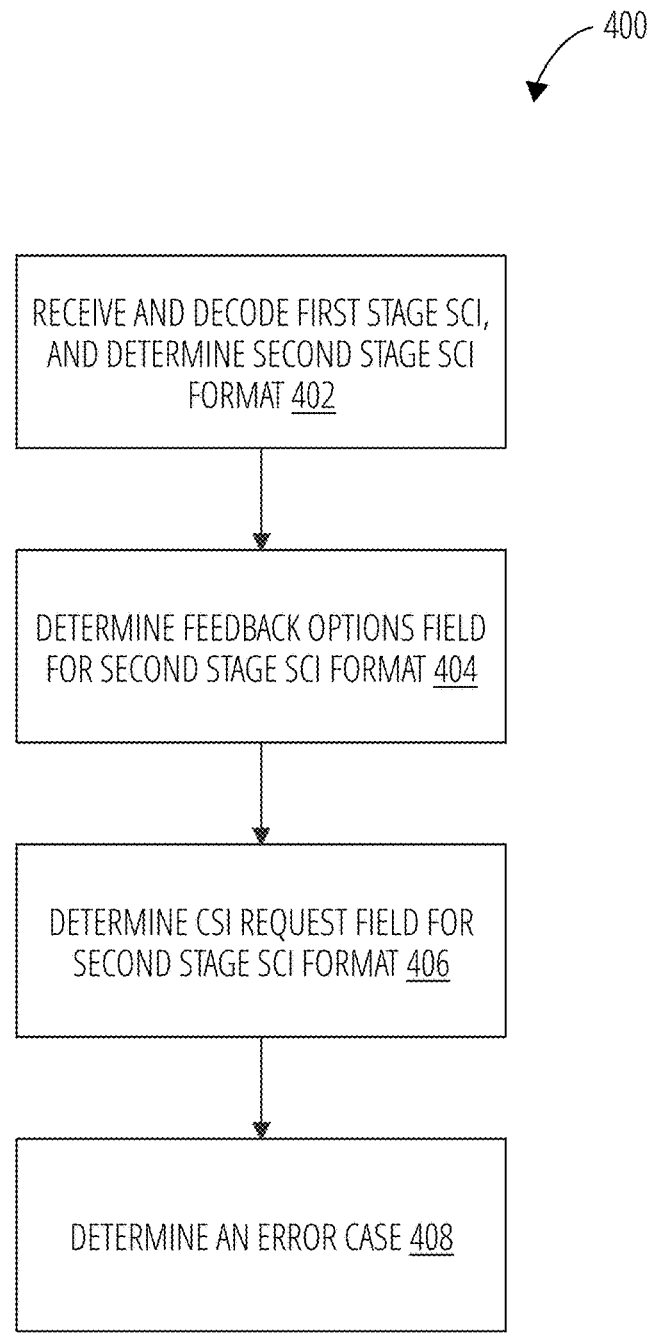
FIG. 4 illustrates a procedure for a signaling scheme for cast-type indication in accordance with certain embodiments.

FIG. 4 illustrates a procedure 400 for a signaling scheme for cast-type indication according to certain embodiments. At block 402, a first stage SCI format is received and decoded at a first UE. For example, the first stage SCI format is received at a first UE from a second UE. The second stage SCI format is determined from the decoded first stage SCI format. For example, the SCI stage 2 format may be a format 1, which includes broadcast, unicast and groupcast without feedback, groupcast HARQ feedback option 2, unicast with feedback, and non-distance based groupcast HARQ option 1 formats. Otherwise, the SCI stage 2 format may be a format 2, which is distance-based groupcast HARQ feedback option 1.

At block 404, the feedback options field is determined for the determined second stage SCI format. In certain embodiments, there is a joint indication of HARQ enabling/disabling and feedback options using two bits. For example, the two bits is "00" when there is no HARQ feedback, which is present when the SCI stage 2 formats are broadcast, unicast without feedback, or groupcast without feedback. For example, the two bits is "01" when there is HARQ feedback for groupcast option 2. Here, ACK/NACK feedback is present with a PSFCH resource that depends on source ID and group member ID. For example, the two bits is "10" when there is HARQ feedback for groupcast option 1. Here, there is non-distance based NACK with PSFCH resource depending on source ID. For example, the two bits is "11" when there is HARQ feedback for unicast. Here, AC/NACK feedback is present with PSFCH resource depending on source ID.

At block 406, CSI request field for the second stage SCI format is determined. The CSI request field may be enabled (i.e., set to one) or disabled (i.e., set to zero). At block 408, an error case is determined. For example, an error case is determined when the CSI request is one (enabled) and the joint indication of HARQ enabling/disabling and feedback options is "01" (i.e., HARQ feedback for groupcast option 2) or "10" (i.e., HARQ feedback for groupcast option 1).

Signaling Scheme for Cast-type Indication (1-3)

Figure 5:
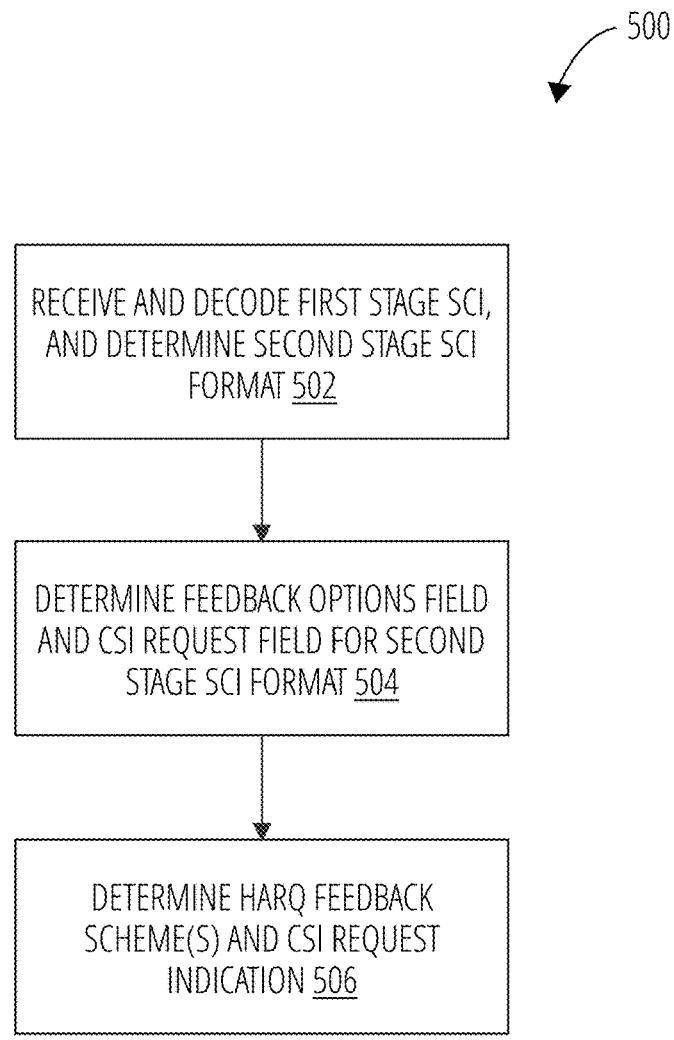
FIG. 5 illustrates a procedure for a signaling scheme for cast-type indication in accordance with certain embodiments.

FIG. 5 illustrates a procedure 500 for a signaling scheme for cast-type indication according to certain embodiments. At block 502, a first stage SCI format is received and decoded at a first UE. For example, the first stage SCI format is received at a first UE from a second UE. The second stage SCI format is determined from the decoded first stage SCI format. For example, the SCI stage 2 format may be a format 1, which includes broadcast, unicast and groupcast without feedback, groupcast HARQ feedback option 2, unicast with feedback, and non-distance based groupcast HARQ option 1 formats. Otherwise, the SCI stage 2 format may be a format 2, which is distance-based groupcast HARQ feedback option 1.

At block 504, the feedback options field and CSI request field are determined for the determined second stage SCI format. In block 506, using the determination of block 504, HARQ feedback scheme and CSI request indication is determined. In certain embodiments, there is a joint indication of HARQ enabling/disabling, feedback options, and CSI request using three bits. For example, the three bits are "000" when the format is broadcast or groupcast without feedback. For example, the three bits are "001" when the format is unicast without feedback with CSI request. For example, the three bits are "010" when the format is unicast without feedback without CSI request. For example, the three bits are "011" when the format is unicast with feedback with CSI request. For example, the three bits are "100" when the format is unicast with feedback, without CSI request. For example, the three bits are "101" when the format is non-distance-based groupcast HARQ feedback option 1. For example, the three bits are "110" when the format is groupcast HARQ feedback option 2. For example, the three bits "111" are reserved, but can be used for CSI request details such as CSI reporting latency bound indication or CSI reference resource indication.

Signaling Scheme for Resource Indication

Figure 6:
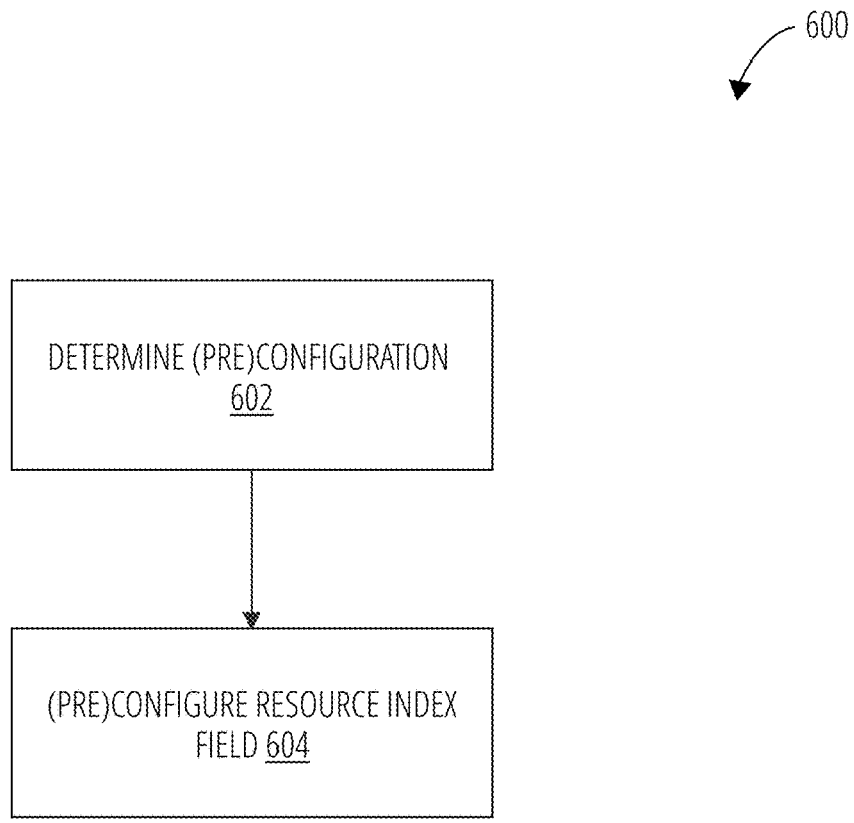
FIG. 6 illustrates a procedure for a signaling scheme for resource indication in accordance with certain embodiments.

FIG. 6 illustrates a procedure 600 for a signaling scheme for resource indication according to certain embodiments. In certain embodiments, resource pool (pre)configuration can be performed for SCI resource index field length. For example, in block 602 (pre)configuration for SCI stage 2 can be determined. In block 604, the (pre)configuration for SCI stage 2 can be adjusted by (pre)configuring the SCI resource index field length. For example, resource index field length is part of resource pool (pre)configuration on PSCCH or PSSCH. In certain embodiments, resource index field length range can be an enumerate of 0, 1, or 2. For example, resource index field length of "0" means no backward resource indication and SCI does not have a resource index field.

For example, resource index field length of "1" means SCI supports backward resource indication and the SCI resource index field has 1 bit. Here, for example, for Nmax=2, resource index equal to 0 implies forward resource indication, while resource index equal to 1 implies backward resource indication. Further, for example, for Nmax=3, resource index equal to 0 implies forward resource indication and resource index equal to 1 implies backward resource indication on the second resource and forward resource indication on the third resource.

In another example, resource index field length of "2" means SCI supports backward resource indication and the SCI resource index field has 2 bits. Here, for example, for Nmax=2, the resource index equal to 0 implies forward resource indication, resource index equal to 1 implies backward resource indication. For example, for Nmax=3, resource index equal to 0 implies forward resource indication, resource index equal to 1 implies backward resource indication on the second resource and forward resource indication on the third resource, and resource index equal to 2 implies backward resource indication.

Resource Re-selection Triggering Conditions

In certain embodiments. For example, mode2 UE resource re-selection triggering conditions may be present where UE selects resource itself for re-transmission when it receives an initial transmission. In certain embodiments, for re-transmission, UE may re-select resources according to transmission prioritization. For example, UE may re-select resources according to NR uplink (UL) and NR sidelink (SL) transmission prioritization, where NR UL transmission may have higher priority than NR SL transmission. In another example, UE may re-select resources according to LTE SL and NE SL transmission prioritization, where LTE SL may have a higher priority than NR SL transmission. In another example, UE may re-select resources according to congestion control which indicates channel availability for transmission.

Sidelink CR Evaluation without Preempted Resources

Figure 7:
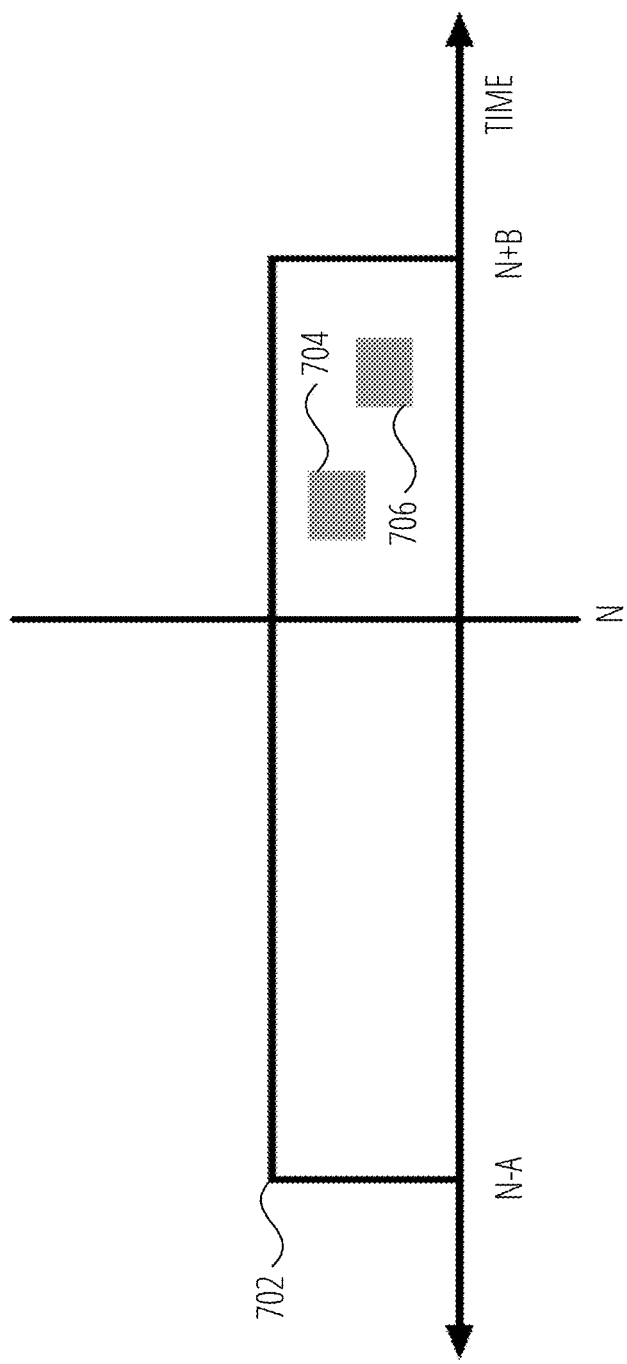
FIG. 7 illustrates a diagram showing sidelink channel occupancy radio (SL CR) evaluation in accordance with certain embodiments.

FIG. 7 illustrates a diagram 700 showing sidelink channel occupancy radio (SL CR) evaluation according to certain embodiments. In certain embodiments, resources are released by UE and are not counted in SL CR evaluation. In certain embodiments, reserved resources preempted by another UE are also not be counted in SL CR evaluation.

For example, in FIG. 7, diagram 700 includes a transmission pool 702 including resource 704 and resource 706. At a slot n in diagram 700, SL CR is evaluated as the total number of subchannels used for its transmissions in slots [n−a, n−1] and granted in slots [n, n+b] divided by the total number of configured sub-channels in transmission pool 702 over [n−a, n+b]. In certain embodiments, one or more resources (e.g., resource 704, resource 706) are released by a UE and not counted in SL CR evaluation. In certain embodiments, one or more resources (e.g., resource 704, resource 706) are reserved by the UE, and then preempted by another UE with higher priority data. In this case, these resources are not counted as used in the SL CR evaluation. Resources not counted as used can be counted as unused instead in SL CR evaluation.

In certain embodiments, if transmissions on resources are dropped due to UL-SL priority or high channel busy ratio (CBR), resources are not counted as used in SL CR evaluation. In certain embodiments, the reserved resources may be released due to HARQ ACK feedback or preemption, and are not counted as used in SL CR evaluation. In one example, resource 704 is a released resource due to HARQ ACK feedback and resource 706 is a released resource due to preemption. Here, resource 704 and resource 706 are not counted as used resources in SL CR evaluation, and are instead counted as unused resources in SL CR evaluation.

Example System Architecture

In certain embodiments, 5G System architecture supports data connectivity and services enabling deployments to use techniques such as Network Function Virtualization and Software Defined Networking. The 5G System architecture may leverage service-based interactions between Control Plane Network Functions. Separating User Plane functions from the Control Plane functions allows independent scalability, evolution, and flexible deployments (e.g., centralized location or distributed (remote) location). Modularized function design allows for function re-use and may enable flexible and efficient network slicing. A Network Function and its Network Function Services may interact with another NF and its Network Function Services directly or indirectly via a Service Communication Proxy. Another intermediate function may help route Control Plane messages. The architecture minimizes dependencies between the AN and the CN. The architecture may include a converged core network with a common AN-CN interface that integrates different Access Types (e.g., 3GPP access and non-3GPP access). The architecture may also support a unified authentication framework, stateless NFs where the compute resource is decoupled from the storage resource, capability exposure, concurrent access to local and centralized services (to support low latency services and access to local data networks, User Plane functions can be deployed close to the AN), and/or roaming with both Home routed traffic as well as Local breakout traffic in the visited PLMN.

The 5G architecture may be defined as service-based and the interaction between network functions may include a service-based representation, where network functions (e.g., AMF) within the Control Plane enable other authorized network functions to access their services. The service-based representation may also include point-to-point reference points. A reference point representation may also be used to show the interactions between the NF services in the network functions described by point-to-point reference point (e.g., N11) between any two network functions (e.g., AMF and SMF).

Figure 8:
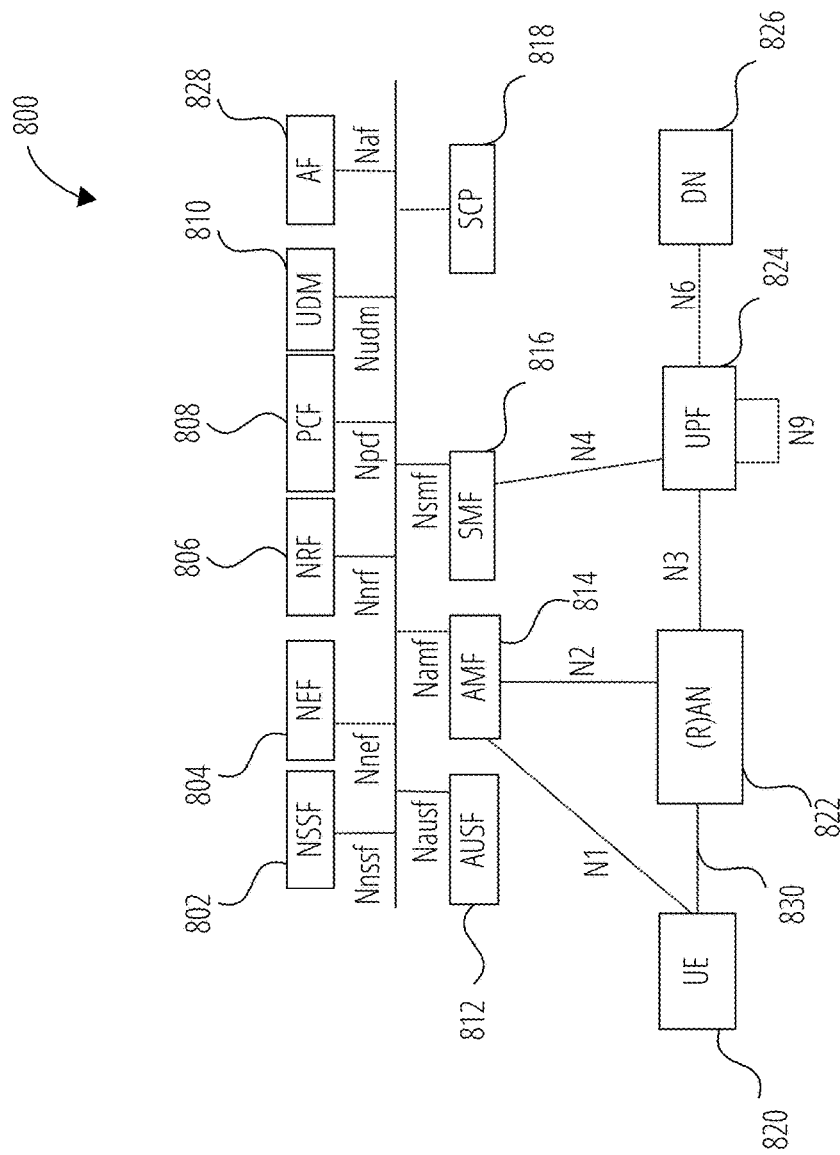
FIG. 8 illustrates an example service based architecture in accordance with certain embodiments.

FIG. 8 illustrates a service based architecture 800 in 5GS according to one embodiment. As described in 3GPP TS 23.501, the service based architecture 800 comprises NFs such as an NSSF 802, a NEF 804, an NRF 806, a PCF 808, a UDM 810, an AUSF 812, an AMF 814, an SMF 816, for communication with a UE 820, a (R)AN 822, a UPF 824, and a DN 826. The NFs and NF services can communicate directly, referred to as Direct Communication, or indirectly via a SCP 818, referred to as Indirect Communication. FIG. 8 also shows corresponding service-based interfaces including Nutm, Naf, Nudm, Npcf, Nsmf, Nnrf, Namf, Nnef, Nnssf, and Nausf, as well as reference points N1, N2, N3, N4, and N6. A few example functions provided by the NFs shown in FIG. 8 are described below.

The NSSF 802 supports functionality such as: selecting the set of Network Slice instances serving the UE; determining the Allowed NSSAI and, if needed, mapping to the Subscribed S-NSSAIs; determining the Configured NSSAI and, if needed, the mapping to the Subscribed S-NSSAIs; and/or determining the AMF Set to be used to serve the UE, or, based on configuration, a list of candidate AMF(s), possibly by querying the NRF.

The NEF 804 supports exposure of capabilities and events. NF capabilities and events may be securely exposed by the NEF 804 (e.g., for 3rd party, Application Functions, and/or Edge Computing). The NEF 804 may store/retrieve information as structured data using a standardized interface (Nudr) to a UDR. The NEF 804 may also secure provision of information from an external application to 3GPP network and may provide for the Application Functions to securely provide information to the 3GPP network (e.g., expected UE behavior, 5GLAN group information, and service specific information), wherein the NEF 804 may authenticate and authorize and assist in throttling the Application Functions. The NEF 804 may provide translation of internal-external information by translating between information exchanged with the AF and information exchanged with the internal network function. For example, the NEF 804 translates between an AF-Service-Identifier and internal 5G Core information such as DNN and S-NSSAI. The NEF 804 may handle masking of network and user sensitive information to external AF's according to the network policy. The NEF 804 may receive information from other network functions (based on exposed capabilities of other network functions), and stores the received information as structured data using a standardized interface to a UDR. The stored information can be accessed and re-exposed by the NEF 804 to other network functions and Application Functions, and used for other purposes such as analytics. For external exposure of services related to specific UE(s), the NEF 804 may reside in the HPLMN. Depending on operator agreements, the NEF 804 in the HPLMN may have interface(s) with NF(s) in the VPLMN. When a UE is capable of switching between EPC and 5GC, an SCEF+NEF may be used for service exposure.

The NRF 806 supports service discovery function by receiving an NF Discovery Request from an NF instance or SCP and providing the information of the discovered NF instances to the NF instance or SCP. The NRF 806 may also support P-CSCF discovery (specialized case of AF discovery by SMF), maintains the NF profile of available NF instances and their supported services, and/or notify about newly registered/updated/deregistered NF instances along with its NF services to the subscribed NF service consumer or SCP. In the context of Network Slicing, based on network implementation, multiple NRFs can be deployed at different levels such as a PLMN level (the NRF is configured with information for the whole PLMN), a shared-slice level (the NRF is configured with information belonging to a set of Network Slices), and/or a slice-specific level (the NRF is configured with information belonging to an S-NSSAI). In the context of roaming, multiple NRFs may be deployed in the different networks, wherein the NRF(s) in the Visited PLMN (known as the vNRF) are configured with information for the visited PLMN, and wherein the NRF(s) in the Home PLMN (known as the hNRF) are configured with information for the home PLMN, referenced by the vNRF via an N27 interface.

The PCF 808 supports a unified policy framework to govern network behavior. The PCF 808 provides policy rules to Control Plane function(s) to enforce them. The PCF 808 accesses subscription information relevant for policy decisions in a Unified Data Repository (UDR). The PCF 808 may access the UDR located in the same PLMN as the PCF.

The UDM 810 supports generation of 3GPP AKA Authentication Credentials, User Identification Handling (e.g., storage and management of SUPI for each subscriber in the 5G system), de-concealment of a privacy-protected subscription identifier (SUCI), access authorization based on subscription data (e.g., roaming restrictions), UE's Serving NF Registration Management (e.g., storing serving AMF for UE, storing serving SMF for UE's PDU Session), service/session continuity (e.g., by keeping SMF/DNN assignment of ongoing sessions, MT-SMS delivery, Lawful Intercept Functionality (especially in outbound roaming cases where a UDM is the only point of contact for LI), subscription management, SMS management, 5GLAN group management handling, and/or external parameter provisioning (Expected UE Behavior parameters or Network Configuration parameters). To provide such functionality, the UDM 810 uses subscription data (including authentication data) that may be stored in a UDR, in which case a UDM implements the application logic and may not require an internal user data storage and several different UDMs may serve the same user in different transactions. The UDM 810 may be located in the HPLMN of the subscribers it serves, and may access the information of the UDR located in the same PLMN.

The AF 828 interacts with the Core Network to provide services that, for example, support the following: application influence on traffic routing; accessing the NEF 804; interacting with the Policy framework for policy control; and/or IMS interactions with 5GC. Based on operator deployment, Application Functions considered to be trusted by the operator can be allowed to interact directly with relevant Network Functions. Application Functions not allowed by the operator to access directly the Network Functions may use the external exposure framework via the NEF 804 to interact with relevant Network Functions.

The AUSF 812 supports authentication for 3GPP access and untrusted non-3GPP access. The AUSF 812 may also provide support for Network Slice-Specific Authentication and Authorization.

The AMF 814 supports termination of RAN CP interface (N2), termination of NAS (N1) for NAS ciphering and integrity protection, registration management, connection management, reachability management, Mobility Management, lawful intercept (for AMF events and interface to LI System), transport for SM messages between UE and SMF, transparent proxy for routing SM messages, Access Authentication, Access Authorization, transport for SMS messages between UE and SMSF, SEAF, Location Services management for regulatory services, transport for Location Services messages between UE and LMF as well as between RAN and LMF, EPS Bearer ID allocation for interworking with EPS, UE mobility event notification, Control Plane CIoT 5GS Optimization, User Plane CIoT 5GS Optimization, provisioning of external parameters (Expected UE Behavior parameters or Network Configuration parameters), and/or Network Slice-Specific Authentication and Authorization. Some or all of the AMF functionalities may be supported in a single instance of the AMF 814. Regardless of the number of Network functions, in certain embodiments there is only one NAS interface instance per access network between the UE and the CN, terminated at one of the Network functions that implements at least NAS security and Mobility Management. The AMF 814 may also include policy related functionalities.

In addition to the functionalities described above, the AMF 814 may include the following functionality to support non-3GPP access networks: support of N2 interface with N3IWF/TNGF, over which some information (e.g., 3GPP Cell Identification) and procedures (e.g., Handover related) defined over 3GPP access may not apply, and non-3GPP access specific information may be applied that do not apply to 3GPP accesses; support of NAS signaling with a UE over N3IWF/TNGF, wherein some procedures supported by NAS signaling over 3GPP access may be not applicable to untrusted non-3GPP (e.g., Paging) access; support of authentication of UEs connected over N3IWF/TNGF; management of mobility, authentication, and separate security context state(s) of a UE connected via a non-3GPP access or connected via a 3GPP access and a non-3GPP access simultaneously; support a coordinated RM management context valid over a 3GPP access and a Non 3GPP access; and/or support dedicated CM management contexts for the UE for connectivity over non-3GPP access. Not all of the above functionalities may be required to be supported in an instance of a Network Slice.

The SMF 816 supports Session Management (e.g., Session Establishment, modify and release, including tunnel maintain between UPF and AN node), UE IP address allocation & management (including optional Authorization) wherein the UE IP address may be received from a UPF or from an external data network, DHCPv4 (server and client) and DHCPv6 (server and client) functions, functionality to respond to Address Resolution Protocol requests and/or IPv6 Neighbor Solicitation requests based on local cache information for the Ethernet PDUs (e.g., the SMF responds to the ARP and/or the IPv6 Neighbor Solicitation Request by providing the MAC address corresponding to the IP address sent in the request), selection and control of User Plane functions including controlling the UPF to proxy ARP or IPv6 Neighbor Discovery or to forward all ARP/IPv6 Neighbor Solicitation traffic to the SMF for Ethernet PDU Sessions, traffic steering configuration at the UPF to route traffic to proper destinations, 5G VN group management (e.g., maintain the topology of the involved PSA UPFs, establish and release the N19 tunnels between PSA UPFs, configure traffic forwarding at UPF to apply local switching, and/or N6-based forwarding or N19-based forwarding), termination of interfaces towards Policy control functions, lawful intercept (for SM events and interface to LI System), charging data collection and support of charging interfaces, control and coordination of charging data collection at the UPF, termination of SM parts of NAS messages, Downlink Data Notification, Initiator of AN specific SM information sent via AMF over N2 to AN, determination of SSC mode of a session, Control Plane CIoT 5GS Optimization, header compression, acting as I-SMF in deployments where I-SMF can be inserted/removed/relocated, provisioning of external parameters (Expected UE Behavior parameters or Network Configuration parameters), P-CSCF discovery for IMS services, roaming functionality (e.g., handle local enforcement to apply QoS SLAB (VPLMN), charging data collection and charging interface (VPLMN), and/or lawful intercept (in VPLMN for SM events and interface to LI System), interaction with external DN for transport of signaling for PDU Session authentication/authorization by external DN, and/or instructing UPF and NG-RAN to perform redundant transmission on N3/N9 interfaces. Some or all of the SMF functionalities may be supported in a single instance of a SMF. However, in certain embodiments, not all of the functionalities are required to be supported in an instance of a Network Slice. In addition to the functionalities, the SMF 816 may include policy related functionalities.

The SCP 818 includes one or more of the following functionalities: Indirect Communication; Delegated Discovery; message forwarding and routing to destination NF/NF services; communication security (e.g., authorization of the NF Service Consumer to access the NF Service Producer's API), load balancing, monitoring, overload control, etc.; and/or optionally interact with the UDR, to resolve the UDM Group ID/UDR Group ID/AUSF Group ID/PCF Group ID/CHF Group ID/HSS Group ID based on UE identity (e.g., SUPI or IMPI/IMPU). Some or all of the SCP functionalities may be supported in a single instance of an SCP. In certain embodiments, the SCP 818 may be deployed in a distributed manner and/or more than one SCP can be present in the communication path between NF Services. SCPs can be deployed at PLMN level, shared-slice level, and slice-specific level. It may be left to operator deployment to ensure that SCPs can communicate with relevant NRFs.

The UE 820 may include a device with radio communication capabilities. For example, the UE 820 may comprise a smartphone (e.g., handheld touchscreen mobile computing devices connectable to one or more cellular networks). The UE 820 may also comprise any mobile or non-mobile computing device, such as Personal Data Assistants (PDAs), pagers, laptop computers, desktop computers, wireless handsets, or any computing device including a wireless communications interface. A UE may also be referred to as a client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE 820 may comprise an IoT UE, which may comprise a network access layer designed for low-power IoT applications utilizing short-lived UE connections. An IoT UE can utilize technologies (e.g., M2M, MTC, or mMTC technology) for exchanging data with an MTC server or device via a PLMN, other UEs using ProSe or D2D communications, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure). The IoT UEs may execute background applications (e.g., keep-alive messages, status updates, etc.) to facilitate the connections of the IoT network.

The UE 820 may be configured to connect or communicatively couple with the (R)AN 822 through a radio interface 830, which may be a physical communication interface or layer configured to operate with cellular communication protocols such as a GSM protocol, a CDMA network protocol, a Push-to-Talk (PTT) protocol, a PTT over Cellular (POC) protocol, a UMTS protocol, a 3GPP LTE protocol, a 5G protocol, a NR protocol, and the like. For example, the UE 820 and the (R)AN 822 may use a Uu interface (e.g., an LTE-Uu interface) to exchange control plane data via a protocol stack comprising a PHY layer, a MAC layer, an RLC layer, a PDCP layer, and an RRC layer. A DL transmission may be from the (R)AN 822 to the UE 820 and a UL transmission may be from the UE 820 to the (R)AN 822. The UE 820 may further use a sidelink to communicate directly with another UE (not shown) for D2D, P2P, and/or ProSe communication. For example, a ProSe interface may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The (R)AN 822 can include one or more access nodes, which may be referred to as base stations (BSs), NodeBs, evolved NodeBs (eNBs), next Generation NodeBs (gNB), RAN nodes, controllers, transmission reception points (TRPs), and so forth, and can comprise ground stations (e.g., terrestrial access points) or satellite stations providing coverage within a geographic area (e.g., a cell). The (R)AN 822 may include one or more RAN nodes for providing macrocells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having an association with the femtocell (e.g., UEs in a Closed Subscriber Group (CSG), UEs for users in the home, etc.).

Although not shown, multiple RAN nodes (such as the (R)AN 822) may be used, wherein an Xn interface is defined between two or more nodes. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for the UE 820 in a connected mode (e.g., CM-CONNECTED) including functionality to manage the UE mobility for connected mode between one or more (R)AN nodes. The mobility support may include context transfer from an old (source) serving (R)AN node to new (target) serving (R)AN node; and control of user plane tunnels between old (source) serving (R)AN node to new (target) serving (R)AN node.

The UPF 824 may act as an anchor point for intra-RAT and inter-RAT mobility, an external PDU session point of interconnect to the DN 826, and a branching point to support multi-homed PDU session. The UPF 824 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. The UPF 824 may include an uplink classifier to support routing traffic flows to a data network. The DN 826 may represent various network operator services, Internet access, or third party services. The DN 826 may include, for example, an application server.

Figure 9:
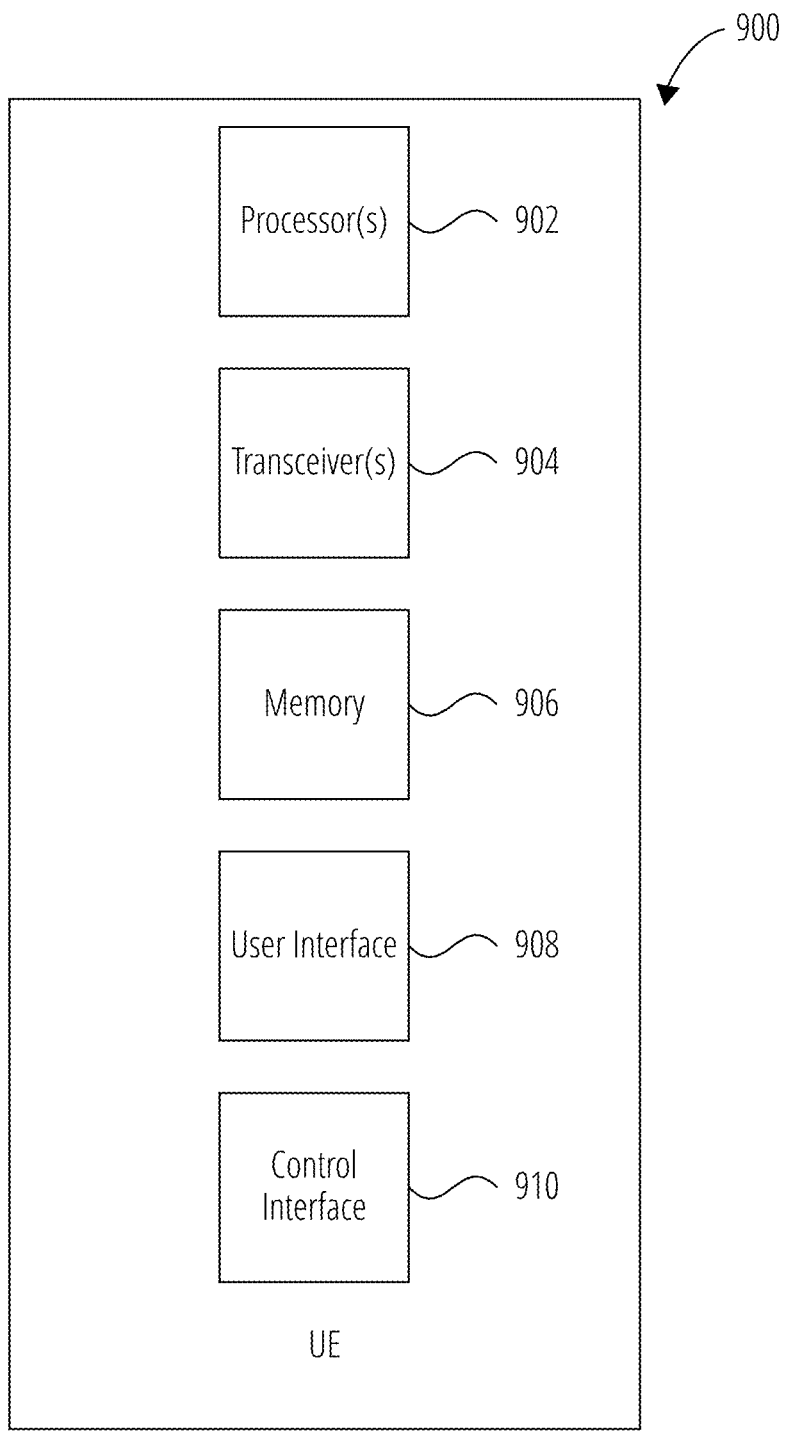
FIG. 9 illustrates a UE in accordance with one embodiment.

FIG. 9 is a block diagram of an example UE 900 configurable according to various embodiments of the present disclosure, including by execution of instructions on a computer-readable medium that correspond to any of the example methods and/or procedures described herein. The UE 900 comprises one or more processor 902, transceiver 904, memory 906, user interface 908, and control interface 910.

The one or more processor 902 may include, for example, an application processor, an audio digital signal processor, a central processing unit, and/or one or more baseband processors. Each of the one or more processor 902 may include internal memory and/or may include interface(s) to communication with external memory (including the memory 906). The internal or external memory can store software code, programs, and/or instructions for execution by the one or more processor 902 to configure and/or facilitate the UE 900 to perform various operations, including operations described herein. For example, execution of the instructions can configure the UE 900 to communicate using one or more wired or wireless communication protocols, including one or more wireless communication protocols standardized by 3GPP such as those commonly known as 5G/NR, LTE, LTE-A, UMTS, HSPA, GSM, GPRS, EDGE, etc., or any other current or future protocols that can be utilized in conjunction with the one or more transceiver 904, user interface 908, and/or control interface 910. As another example, the one or more processor 902 may execute program code stored in the memory 906 or other memory that corresponds to MAC, RLC, PDCP, and RRC layer protocols standardized by 3GPP (e.g., for NR and/or LTE). As a further example, the processor 902 may execute program code stored in the memory 906 or other memory that, together with the one or more transceiver 904, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

The memory 906 may comprise memory area for the one or more processor 902 to store variables used in protocols, configuration, control, and other functions of the UE 900, including operations corresponding to, or comprising, any of the example methods and/or procedures described herein. Moreover, the memory 906 may comprise non-volatile memory (e.g., flash memory), volatile memory (e.g., static or dynamic RAM), or a combination thereof. Furthermore, the memory 906 may interface with a memory slot by which removable memory cards in one or more formats (e.g., SD Card, Memory Stick, Compact Flash, etc.) can be inserted and removed.

The one or more transceiver 904 may include radio-frequency transmitter and/or receiver circuitry that facilitates the UE 900 to communicate with other equipment supporting like wireless communication standards and/or protocols. For example, the one or more transceiver 904 may include switches, mixer circuitry, amplifier circuitry, filter circuitry, and synthesizer circuitry. Such RF circuitry may include a receive signal path with circuitry to down-convert RF signals received from a front-end module (FEM) and provide baseband signals to a baseband processor of the one or more processor 902. The RF circuitry may also include a transmit signal path which may include circuitry to up-convert baseband signals provided by a baseband processor and provide RF output signals to the FEM for transmission. The FEM may include a receive signal path that may include circuitry configured to operate on RF signals received from one or more antennas, amplify the received signals and provide the amplified versions of the received signals to the RF circuitry for further processing. The FEM may also include a transmit signal path that may include circuitry configured to amplify signals for transmission provided by the RF circuitry for transmission by one or more antennas. In various embodiments, the amplification through the transmit or receive signal paths may be done solely in the RF circuitry, solely in the FEM, or in both the RF circuitry and the FEM circuitry. In some embodiments, the FEM circuitry may include a TX/RX switch to switch between transmit mode and receive mode operation.

In some exemplary embodiments, the one or more transceiver 904 includes a transmitter and a receiver that enable device 1200 to communicate with various 5G/NR networks according to various protocols and/or methods proposed for standardization by 3 GPP and/or other standards bodies. For example, such functionality can operate cooperatively with the one or more processor 902 to implement a PHY layer based on OFDM, OFDMA, and/or SC-FDMA technologies, such as described herein with respect to other figures.

The user interface 908 may take various forms depending on particular embodiments, or can be absent from the UE 900. In some embodiments, the user interface 908 includes a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 900 may comprise a tablet computing device including a larger touchscreen display. In such embodiments, one or more of the mechanical features of the user interface 908 may be replaced by comparable or functionally equivalent virtual user interface features (e.g., virtual keypad, virtual buttons, etc.) implemented using the touchscreen display, as familiar to persons of ordinary skill in the art. In other embodiments, the UE 900 may be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many example embodiments of the UE 900 having a touch screen display are capable of receiving user inputs, such as inputs related to exemplary methods and/or procedures described herein or otherwise known to persons of ordinary skill in the art.

In some exemplary embodiments of the present disclosure, the UE 900 may include an orientation sensor, which can be used in various ways by features and functions of the UE 900. For example, the UE 900 can use outputs of the orientation sensor to determine when a user has changed the physical orientation of the UE 900's touch screen display. An indication signal from the orientation sensor can be available to any application program executing on the UE 900, such that an application program can change the orientation of a screen display (e.g., from portrait to landscape) automatically when the indication signal indicates an approximate 90-degree change in physical orientation of the device. In this manner, the application program can maintain the screen display in a manner that is readable by the user, regardless of the physical orientation of the device. In addition, the output of the orientation sensor can be used in conjunction with various exemplary embodiments of the present disclosure.

The control interface 910 may take various forms depending on particular embodiments. For example, the control interface 910 may include an RS-232 interface, an RS-485 interface, a USB interface, an HDMI interface, a Bluetooth interface, an IEEE ("Firewire") interface, an I²C interface, a PCMCIA interface, or the like. In some exemplary embodiments of the present disclosure, control interface 1260 can comprise an IEEE 802.3 Ethernet interface such as described above. In some embodiments of the present disclosure, the control interface 910 may include analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 900 may include more functionality than is shown in FIG. 9 including, for example, a video and/or still-image camera, microphone, media player and/or recorder, etc. Moreover, the one or more transceiver 904 may include circuitry for communication using additional radio-frequency communication standards including Bluetooth, GPS, and/or others. Moreover, the one or more processor 902 may execute software code stored in the memory 906 to control such additional functionality. For example, directional velocity and/or position estimates output from a GPS receiver can be available to any application program executing on the UE 900, including various exemplary methods and/or computer-readable media according to various exemplary embodiments of the present disclosure.

Figure 10:
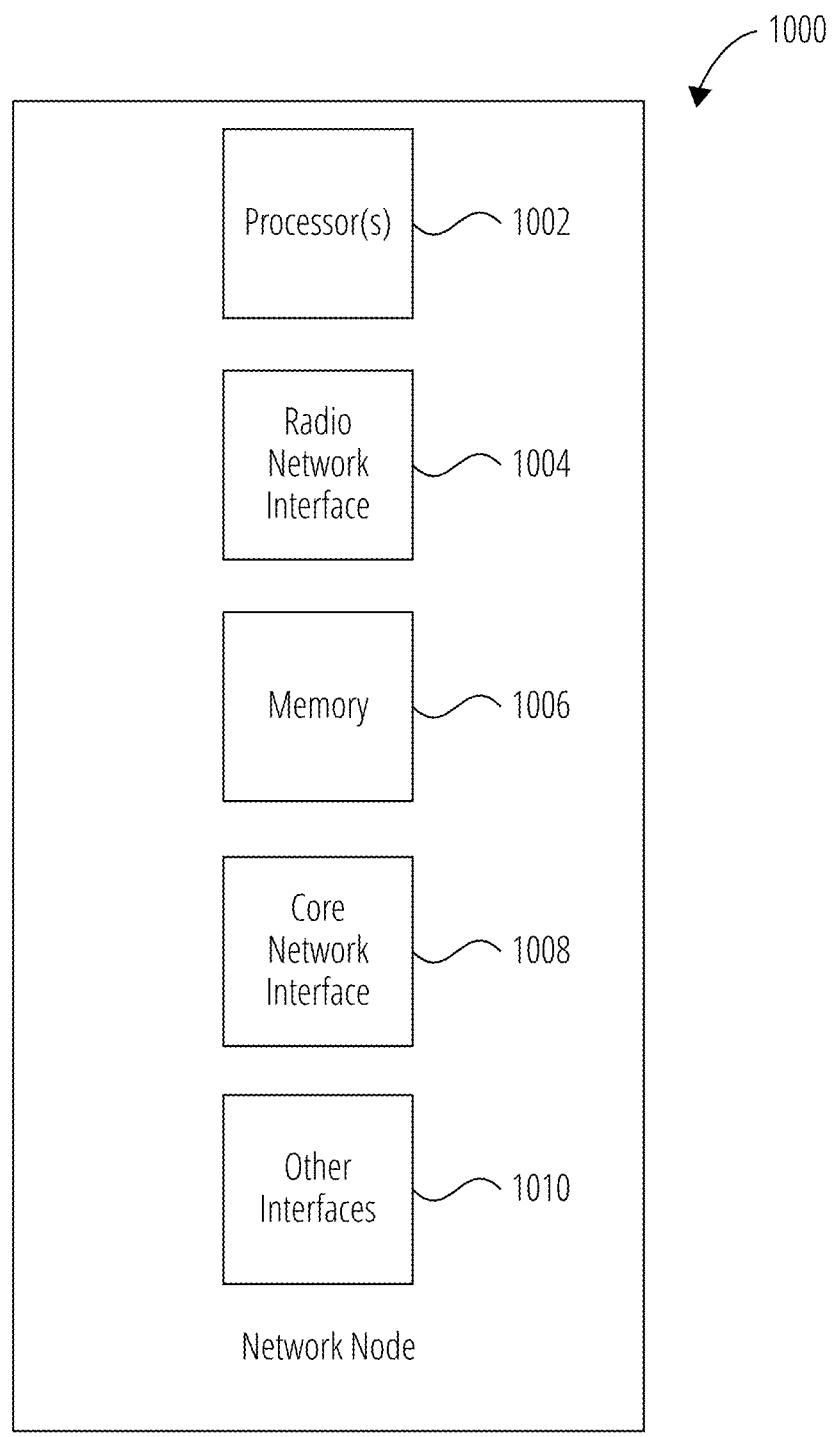
FIG. 10 illustrates a network node in accordance with one embodiment.

FIG. 10 is a block diagram of an example network node 1000 configurable according to various embodiments of the present disclosure, including by execution of instructions on a computer-readable medium that correspond to any of the example methods and/or procedures described herein.

The network node 1000 includes a one or more processor 1002, a radio network interface 1004, a memory 1006, a core network interface 1008, and other interfaces 1010. The network node 1000 may comprise, for example, a base station, eNB, gNB, access node, or component thereof.

The one or more processor 1002 may include any type of processor or processing circuitry and may be configured to perform an of the methods or procedures disclosed herein. The memory 1006 may store software code, programs, and/or instructions executed by the one or more processor 1002 to configure the network node 1000 to perform various operations, including operations described herein. For example, execution of such stored instructions can configure the network node 1000 to communicate with one or more other devices using protocols according to various embodiments of the present disclosure, including one or more methods and/or procedures discussed above. Furthermore, execution of such stored instructions can also configure and/or facilitate the network node 1000 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with the radio network interface 1004 and the core network interface 1008. By way of example and without limitation, the core network interface 1008 comprise an S1 interface and the radio network interface 1004 may comprise a Uu interface, as standardized by 3GPP. The memory 1006 may also store variables used in protocols, configuration, control, and other functions of the network node 1000. As such, the memory 1006 may comprise non-volatile memory (e.g., flash memory, hard disk, etc.), volatile memory (e.g., static or dynamic RAM), network-based (e.g., "cloud") storage, or a combination thereof.

The radio network interface 1004 may include transmitters, receivers, signal processors, ASICs, antennas, beamforming units, and other circuitry that enables network node 1000 to communicate with other equipment such as, in some embodiments, a plurality of compatible user equipment (UE). In some embodiments, the network node 1000 may include various protocols or protocol layers, such as the PHY, MAC, RLC, PDCP, and RRC layer protocols standardized by 3GPP for LTE, LTE-A, and/or 5G/NR. According to further embodiments of the present disclosure, the radio network interface 1004 may include a PHY layer based on OFDM, OFDMA, and/or SC-FDMA technologies. In some embodiments, the functionality of such a PHY layer can be provided cooperatively by the radio network interface 1004 and the one or more processor 1002.

The core network interface 1008 may include transmitters, receivers, and other circuitry that enables the network node 1000 to communicate with other equipment in a core network such as, in some embodiments, circuit-switched (CS) and/or packet-switched Core (PS) networks. In some embodiments, the core network interface 1008 may include the S1 interface standardized by 3GPP. In some embodiments, the core network interface 1008 may include one or more interfaces to one or more SGWs, MMEs, SGSNs, GGSNs, and other physical devices that comprise functionality found in GERAN, UTRAN, E-UTRAN, and CDMA 2000 core networks that are known to persons of ordinary skill in the art. In some embodiments, these one or more interfaces may be multiplexed together on a single physical interface. In some embodiments, lower layers of the core network interface 1008 may include one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

The other interfaces 1010 may include transmitters, receivers, and other circuitry that enables the network node 1000 to communicate with external networks, computers, databases, and the like for purposes of operations, administration, and maintenance of the network node 1000 or other network equipment operably connected thereto.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLE SECTION

The following examples pertain to further embodiments.

Example 1A may include a method for signaling in cast-type indication for a wireless communication system, the method comprising: receiving, at a first user equipment (UE), a first stage sidelink control information (SCI) format from a second UE; decoding the first stage SCI format; determining a second stage SCI format using the decoded first stage SCI format; decoding the second stage SCI format; and determining a sidelink feedback status using the second stage SCI format, wherein the sidelink feedback status indicates whether sidelink feedback is enabled or not enabled, and wherein second stage SCI content includes a distance setting associated with a communication range between the first UE and the second UE.

Example 2A may include the method of example 1A, further comprising: determining the sidelink feedback is enabled, wherein a type of the sidelink feedback is dependent on the distance setting of the second stage SCI content.

Example 3A may include the method of Example 2A, wherein the type of the sidelink feedback is distance-based NACK feedback and non-distance-based NACK feedback.

Example 4A may include the method of Example 3A, wherein the distance setting is a communication range requirement field, and wherein the communication range requirement field is set to infinite for the non-distance-based NACK feedback.

Example 5A may include the method of Example 3A, wherein the distance setting is a communication range requirement field, and wherein the communication range requirement field is set to a non-infinite value for the distance-based NACK feedback.

Example 6A may include the method of Example 1, wherein the second stage SCI format is groupcast hybrid automatic repeat request (HARQ) feedback option 1, and wherein the method further comprises determining negative acknowledgment (NACK) only feedback is available.

Example 7A may include the method of Example 6A, wherein the NACK only feedback is distance-based NACK feedback.

Example 8A may include the method of Example 3A, wherein the NACK only feedback is distance-based NACK feedback and non-distance-based NACK feedback.

Example 9A may include the method of Example 1A, further comprising: determining that sidelink feedback is enabled; and determining a physical sidelink feedback channel (PSFCH) resource determination scheme.

Example 10A may include the method of Example 9A, wherein the PSFCH resource determination scheme is indicated by a bit, and wherein the bit is 0 when the PSFCH resource determination scheme is determined by source identifier (ID), and the bit is 1 when the PSFCH resource determination scheme is determined by source ID and group member ID.

Example 11A may include the method of Example 1A, wherein the feedback status is represented by a bit in a second stage SCI format field of the decoded second stage SCI format.

Example 12A may include the method of Example 11A, wherein the bit is 0 when feedback is disabled.

Example 13A may include the method of Example 12A, wherein the second stage SCI format is broadcast, unicast without feedback, or groupcast without feedback.

Example 14A may include the method of Example 11A, wherein the bit is 1 when feedback is enabled.

Example 15A may include the method of Example 14A, wherein the second stage SCI format is groupcast hybrid automatic repeat request (HARQ) feedback option 2 or unicast with feedback.

Example 16A may include a non-transitory computer-readable storage medium, the computer-readable storage medium including instructions that when executed by a processor, cause the processor to: receive, at a first user equipment (UE), a first stage sidelink control information (SCI) format from a second UE; decode the first stage SCI format; determine a second stage SCI format using the decoded first stage SCI format; decode the second stage SCI format; and determine a sidelink feedback status using the second stage SCI format, wherein the sidelink feedback status indicates whether sidelink feedback is enabled or not enabled, and wherein second stage SCI content includes a distance setting associated with a communication range between the first UE and the second UE.

Example 17A may include the non-transitory computer-readable storage medium of Example 16A, wherein the instructions further cause the processor to: determine the sidelink feedback is enabled, wherein a type of the sidelink feedback is dependent on the distance setting of the second stage SCI content.

Example 18A may include the non-transitory computer-readable storage medium of Example 17A, wherein the type of the sidelink feedback is distance-based NACK feedback and non-distance-based NACK feedback.

Example 19A may include the non-transitory computer-readable storage medium of Example 18A, wherein the distance setting is a communication range requirement field, and wherein the communication range requirement field is set to infinite for the non-distance-based NACK feedback.

Example 20A may include the non-transitory computer-readable storage medium of Example 18A, wherein the distance setting is a communication range requirement field, and wherein the communication range requirement field is set to a non-infinite value for the distance-based NACK feedback.

Example 21A may include a computing apparatus, the computing apparatus comprising: a processor; and a memory storing instructions that, when executed by the processor, configure the apparatus to: receive, at a first user equipment (UE), a first stage sidelink control information (SCI) format from a second UE; decode the first stage SCI format; determine a second stage SCI format using the decoded first stage SCI format; decode the second stage SCI format; and determine a sidelink feedback status using the second stage SCI format, wherein the sidelink feedback status indicates whether sidelink feedback is enabled or not enabled, and wherein second stage SCI content includes a distance setting associated with a communication range between the first UE and the second UE.

Example 22A may include the computing apparatus of Example 21A, wherein the instructions further configure the apparatus to: determine the sidelink feedback is enabled, wherein a type of the sidelink feedback is dependent on the distance setting of the second stage SCI content.

Example 23A may include the computing apparatus of Example 22A, wherein the type of the sidelink feedback is distance-based NACK feedback and non-distance-based NACK feedback.

Example 24A may include the computing apparatus of Example 23A, wherein the distance setting is a communication range requirement field, and wherein the communication range requirement field is set to infinite for the non-distance-based NACK feedback.

Example 25A may include the computing apparatus of Example 23A, wherein the distance setting is a communication range requirement field, and wherein the communication range requirement field is set to a non-infinite value for the distance-based NACK feedback.

Example 1 may include an apparatus comprising means to perform one or more elements of a method described in or related to any other method or process described herein.

Example 2 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 3 may include an apparatus comprising logic, modules, or circuitry to perform one or more elements of a method described in or related to any of the above Examples, or any other method or process described herein.

Example 4 may include a method, technique, or process as described in or related to any of the above Examples, or portions or parts thereof Example 5 may include an apparatus comprising: one or more processors and one or more computer-readable media comprising instructions that, when executed by the one or more processors, cause the one or more processors to perform the method, techniques, or process as described in or related to any of the above Examples, or portions thereof Example 6 may include a signal as described in or related to any of the above Examples, or portions or parts thereof.

Example 7 may include a datagram, packet, frame, segment, protocol data unit (PDU), or message as described in or related to any of the above Examples, or portions or parts thereof, or otherwise described in the present disclosure.

Example 8 may include a signal encoded with data as described in or related to any of the above Examples, or portions or parts thereof, or otherwise described in the present disclosure.

Example 9 may include a signal encoded with a datagram, packet, frame, segment, PDU, or message as described in or related to any of the above Examples, or portions or parts thereof, or otherwise described in the present disclosure.

Example 10 may include an electromagnetic signal carrying computer-readable instructions, wherein execution of the computer-readable instructions by one or more processors is to cause the one or more processors to perform the method, techniques, or process as described in or related to any of the above Examples, or portions thereof Example 11 may include a computer program comprising instructions, wherein execution of the program by a processing element is to cause the processing element to carry out the method, techniques, or process as described in or related to any of the above Examples, or portions thereof.

Example 12 may include a signal in a wireless network as shown and described herein.

Example 13 may include a method of communicating in a wireless network as shown and described herein.

Example 14 may include a system for providing wireless communication as shown and described herein.

Example 15 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for signaling in cast-type indication for a wireless communication system, the method comprising:
receiving, at a first user equipment (UE), a first stage sidelink control information (SCI) format from a second UE;
decoding the first stage SCI format;
determining a second stage SCI format using the decoded first stage SCI format;
receiving the second stage SCI format;
decoding the second stage SCI format; and
determining a sidelink feedback status using the second stage SCI format,
wherein the sidelink feedback status indicates whether sidelink feedback is enabled or not enabled, and wherein second stage SCI content includes a distance setting associated with a communication range between the first UE and the second UE.

2. The method of claim 1, further comprising:
determining the sidelink feedback is enabled, wherein a type of the sidelink feedback is dependent on the distance setting of the second stage SCI content.

3. The method of claim 2, wherein the type of the sidelink feedback is distance-based NACK feedback and non-distance-based NACK feedback.

4. The method of claim 3, wherein the distance setting is a communication range requirement field, and wherein the communication range requirement field is set to infinite for the non-distance-based NACK feedback.

5. The method of claim 3, wherein the distance setting is a communication range requirement field, and wherein the communication range requirement field is set to a non-infinite value for the distance-based NACK feedback.

6. The method of claim 1, wherein the second stage SCI format is groupcast hybrid automatic repeat request (HARQ) feedback option 1, and wherein the method further comprises determining negative acknowledgement (NACK) only feedback is available.

7. The method of claim 6, wherein the NACK only feedback is distance-based NACK feedback.

8. The method of claim 6, wherein the NACK only feedback is distance-based NACK feedback and non-distance-based NACK feedback.

9. The method of claim 1, further comprising:
determining that the sidelink feedback is enabled; and
determining a physical sidelink feedback channel (PSFCH) resource determination scheme.

10. The method of claim 9, wherein the PSFCH resource determination scheme is indicated by a bit, and wherein
the bit is 0 when the PSFCH resource determination scheme is determined by source identifier (ID), and
the bit is 1 when the PSFCH resource determination scheme is determined by source ID and group member ID.

11. The method of claim 1, wherein the feedback status is represented by a bit in a second stage SCI format field of the decoded second stage SCI format.

12. The method of claim 11, wherein the bit is 0 when feedback is disabled.

13. The method of claim 12, wherein the second stage SCI format is broadcast, unicast without feedback, or groupcast without feedback.

14. The method of claim 11, wherein the bit is 1 when feedback is enabled.

15. The method of claim 14, wherein the second stage SCI format is groupcast hybrid automatic repeat request (HARQ) feedback option 2 or unicast with feedback.

16. A non-transitory computer-readable storage medium, the computer-readable storage medium including instructions that when executed by a processor, cause the processor to:
receive, at a first user equipment (UE), a first stage sidelink control information (SCI) format from a second UE;
decode the first stage SCI format;
determine a second stage SCI format using the decoded first stage SCI format;
receive the second stage SCI format;
decode the second stage SCI format; and
determine a sidelink feedback status using the second stage SCI format, wherein the sidelink feedback status indicates whether sidelink feedback is enabled or not enabled, and wherein second stage SCI content includes a distance setting associated with a communication range between the first UE and the second UE.

17. The non-transitory computer-readable storage medium of claim 16, wherein the instructions further cause the processor to:
determine the sidelink feedback is enabled, wherein a type of the sidelink feedback is dependent on the distance setting of the second stage SCI content.

18. The non-transitory computer-readable storage medium of claim 17, wherein the type of the sidelink feedback is distance-based NACK feedback and non-distance-based NACK feedback.

19. The non-transitory computer-readable storage medium of claim 18, wherein the distance setting is a communication range requirement field, and wherein the communication range requirement field is set to infinite for the non-distance-based NACK feedback.

20. The non-transitory computer-readable storage medium of claim 18, wherein the distance setting is a communication range requirement field, and wherein the communication range requirement field is set to a non-infinite value for the distance-based NACK feedback.

* * * * *